(12) United States Patent
Gabrys

(10) Patent No.: US 6,710,489 B1
(45) Date of Patent: Mar. 23, 2004

(54) AXIALLY FREE FLYWHEEL SYSTEM

(75) Inventor: Christopher W. Gabrys, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 0 days.

(21) Appl. No.: 10/232,793

(22) Filed: Aug. 28, 2002

Related U.S. Application Data

(60) Provisional application No. 60/316,559, filed on Aug. 30, 2001.

(51) Int. Cl.$^7$ ................................................. H02K 7/09
(52) U.S. Cl. ............................ 310/90.5; 310/90; 310/74
(58) Field of Search ..................... 310/90, 90.5, 91, 310/74; 384/125, 127, 128, 192, 199, 200, 218, 418, 490–492, 618

(56) References Cited

U.S. PATENT DOCUMENTS

| | | | | |
|---|---|---|---|---|
| 4,211,452 A | * | 7/1980 | Poubeau .................... | 310/90.5 |
| 4,511,190 A | * | 4/1985 | Caye et al. ................ | 310/90.5 |
| 4,563,046 A | * | 1/1986 | Shimamoto ................ | 310/90.5 |
| 4,566,740 A | * | 1/1986 | Beau et al. ................ | 310/90.5 |
| 4,700,094 A | * | 10/1987 | Downer et al. ............ | 310/90.5 |
| 4,723,735 A | * | 2/1988 | Eisenhaure et al. ........ | 244/165 |
| 4,785,212 A | * | 11/1988 | Downer et al. ............ | 310/90.5 |
| 5,614,777 A | * | 3/1997 | Bitterly et al. ............ | 310/74 |
| 5,708,312 A | * | 1/1998 | Rosen et al. ............... | 310/90 |
| 5,920,138 A | | 7/1999 | Clifton et al. ............. | 310/90.5 |
| 5,998,899 A | * | 12/1999 | Rosen et al. .............. | 310/90.5 |
| 6,262,505 B1 | | 7/2001 | Hockney et al. ........... | 310/90.5 |
| 6,388,347 B1 | * | 5/2002 | Blake et al. ................ | 310/74 |

OTHER PUBLICATIONS

Sibley, Lewis B., "Advanced Technology Ceramic Bearings in The Flywheel Systems at World Flywheel Consortium", Flywheel Energy Storage Workshop, Oak Ridge TN, Oct. 31–Nov. 2, 1995.
Briest, R., "Alternative Power Storages for UPS–Systems" http:www.piller.com/us/pq97.html.

* cited by examiner

Primary Examiner—Tran Nguyen
(74) Attorney, Agent, or Firm—J. Michael Neary

(57) ABSTRACT

A flywheel energy storage system that allows high-speed operation with use of mechanical rolling element bearings for radial support of a vertical axis flywheel while they allow it to be mechanically free or unrestrained in the axial direction. Magnetic bearings are used to carry the flywheel weight axially. The axial unconstraint by the mechanical bearings allows the flywheel to freely grow or shrink in axial length from Poisson Effect contraction that occurs when rotating to very high speeds and stress levels as well as from thermal expansions from motor/generator heating or other sources, and also insures that the magnetic bearing carries all of the flywheel weight, thus greatly extending the life of the mechanical bearings. Radially compliant elements mechanically in series with the mechanical bearings provide for a lower radial stiffness, which allows the flywheel to traverse its rigid body resonance at a low speed. Above that speed, the flywheel spins about its mass center instead of the geometric center and radial loading on the bearing becomes much lower.

23 Claims, 12 Drawing Sheets

AXIALLY FREE FLYWHEEL SYSTEM

This is related to U.S. Provisional Application No. 60/316,559 filed on Aug. 30, 2001 and entitled "Axially Free Flywheel System".

This invention pertains to a flywheel energy storage system and more particularly to a flywheel system having a flywheel supported by a combination of an axial magnetic bearing and compliant radial rolling element mechanical bearings, with the flywheel being mechanically unrestrained in the axial direction. The unrestrained axial support allows for Poisson Effect contraction and thermal expansions during operation and simultaneously greatly extends the mechanical bearing life by reducing or eliminating axial loading. The radial compliance in the mechanical bearing support permits high-speed supercritical operation and reduced radial bearing loads.

BACKGROUND OF THE INVENTION

Flywheel power supplies have emerged as an alternative to electrochemical batteries for storing energy, with many advantages including higher reliability, longer life, lower or no maintenance, higher power capability and environmental friendliness. Flywheel power supplies store energy in a rotating flywheel that is supported by a low friction bearing system inside a chamber. The chamber is usually evacuated to reduce losses from aerodynamic drag. A motor/generator accelerates the flywheel for storing energy, and decelerates the flywheel for retrieving energy. Power electronics maintain the flow of energy in and out of the system and can instantaneously prevent power interruptions, or alternatively can manage peak loads.

One way to support a flywheel for rotation at high speeds is with rolling element mechanical bearings such as ball bearings. The life of mechanical bearings is strongly influenced by the loads that these bearings must carry. To extend the life of flywheel systems using mechanical bearings, a magnetic bearing can effectively be used in combination with the mechanical bearings for the purpose of reducing the load on the mechanical bearings. In this arrangement, the flywheel typically rotates about a vertical axis and the mechanical bearings provide radial support while the magnetic bearing carries much of the flywheel's weight axially. One such flywheel energy storage system is shown in FIG. 1. The flywheel system 30 includes a steel flywheel 31 that rotates inside an evacuated vessel 32. The interior of the vessel 32 is a chamber 41 maintained at a vacuum for reduction of aerodynamic drag. The flywheel 31, in this design, has an integrated motor/generator 33 that accelerates and decelerates the flywheel through cooperation with the outer diameter of the flywheel 31. The motor/generator 33 includes an outer laminated stator portion 34, motor/generator coils 42, stator flux return path 35 and a field coil 36 for operation. The flywheel 31 is supported for rotation on upper and lower rolling element mechanical bearings 37 and 39. These bearings 37, 39 are mounted in fixed upper and lower mounts 38 and 40. Load on the bearings 37, 39 is reduced through the use of an axial magnetic bearing 43, shown as an annular electromagnet with electromagnetic coil 44. The magnetic bearing 43 supports a majority of the weight of the flywheel 31 while allowing some desired amount of loading on the bearings 37, 39. The electromagnet is controlled either by using strain gauges, not shown, on the support structure that sense and control the bearing loading through use of a closed loop controller, or simply by use of a constant current power supply.

Unfortunately, this configuration of mechanical and magnetic bearing system is not optimal for allowing rotation to very high-speeds for efficiently storing large amounts of energy. There are several drawbacks. The rigid radial support provided by the mechanical bearings would cause the rigid body critical speeds to be encountered at a relatively high speed if the flywheel were operated to high speeds. Encountering these resonances at a high speed would impart severe loading on the bearings that would reduce their life and potentially be dangerous. Operation at high speeds, but below the rigid body critical speeds, causes high bearing loading from any flywheel imbalances because the flywheel is being forced to spin about a geometric center rather than the mass center.

Another major problem with operating a flywheel system to high speeds is that the loads on the bearings can significantly increase due to dimensional changes in the flywheel. The effect of high speed rotation is illustrated in FIG. 2. The dimensions of a flywheel 50 are shown at 52 for zero speed and at 51 for high speed rotation. The effect of the centrifugal stress is that the outer diameter expectedly grows by a radial increment 53 from the radial and hoop stresses. This growth does not change the bearing loading. The secondary result from this growth is that the flywheel shrinks by an axial increment 54 from Poisson ratio contraction. For axially thick flywheels, the shrinkage can be as much as 0.050 inches. Such a large length change will not only drastically load the mechanical bearings against each other but can also cause them to fail before achieving full speed. The flywheel can also expand and contract axially from temperature changes in the flywheel or surrounding structure. Heating from high power motor/generators is one potential cause for added bearing loads.

The increased bearing loading drastically affects the life of mechanical bearings. Bearing life is generally a cubic function of the load, so that a doubling of the load will decrease the life by a factor of eight. Further compounding the shortening of life from the increased axial loading is that for angular contact bearings, axial loading can be as much as 35 times more fatiguing to the bearing than an equivalent size radial load. This sensitivity varies based on the contact angle, number of balls, ball diameter and the axial thrust load applied.

Besides problems of axial bearing loading that occurs between the bearings during operation, use of a mechanical strain gauges to measure axial loading at a single bearing is not as sensitive as desirable for removing almost the entire bearing axial load, especially if the flywheel support structure is rigid. Likewise, applying a constant current to the coil cannot provide sufficiently accurate axial load removal for maximum reliable operating life.

The construction of flywheel systems that support a flywheel with mechanical bearings can also suffer significant damage from shipping and handling. The system shown in FIG. 1 has no power during shipping and hence the ball bearings must carry the full flywheel weight. The strain gage and load cell can become damaged and plastically deformed from impact loadings, especially if they were designed to be sensitive enough to maintain very low axial bearing loading. The bearings of this as well as other design systems could be easily damaged from impact loads such as simply setting the system down during transportation handling. The force generated from an impact can be several times the weight of the flywheel and can cause the balls to Brinnell indent the bearing races or cause the bearings to shift in position.

SUMMARY OF THE INVENTION

This invention provides a flywheel energy storage system that allows high-speed operation with use of mechanical rolling element bearings for flywheel support. The mechanical bearings provide radial support for a vertical axis flywheel but they allow it to be mechanically free or unrestrained in the axial direction. One or more magnetic bearings are used to carry the flywheel weight axially. The axial unconstraint by the mechanical bearings allows the flywheel to freely grow or shrink in axial length from Poisson Effect contraction that occurs when rotating to very high speeds and stress levels as well as from thermal expansions from motor/generator heating or other sources. Excessive axial loads applied from the bearings on each other are thereby prevented. The axial mechanical freedom also insures that the magnetic bearing carries all of the flywheel weight, thus dramatically extending the mechanical bearing lives. The life of rolling element bearings is generally a cubic function of the applied loads and axial loading on commonly used angular contact bearings is many times more fatiguing to the bearings than radially applied loads. Eliminating the axial loading from the flywheel greatly extends the bearing lives. Tandem multiple preloaded angular contact bearings can be used for the mechanical bearings. These bearing sets share the loads between several bearings, extending life, and are manufactured with the desirable minimum axial preload for longest term reliable operation. The axial preload is accurately built-in and does not change as the flywheel is rotated. Alternatively, the bearings can each be single bearing pairs that are preloaded using springs with a stiffness that is lower than the magnetic bearing. Therefore, the bearings maintain their near designed preload despite the axial position of the flywheel from the magnetic bearing support or changes in the flywheel dimensions.

The axial magnetic bearings can use permanent magnets, attached to the flywheel, that are arranged to be in vertical repulsion with stationary cooperating permanent magnets. This provides a completely passive axial magnetic bearing system. In another embodiment of the invention, the axial magnetic bearing uses an actively controlled electromagnetic coil. The coil is controlled using either flywheel axial acceleration or, more preferably, a position sensor. The coil can be used in a simple electromagnet or in a permanent magnet biased thrust actuator for higher lift force and/or lower power consumption. The use of an active magnetic bearing does not require magnets on the flywheel and has the potential for higher speed rotation. It also can be lower in cost, and not suffer from any demagnetization effects.

The high speed capability of flywheels in accordance with the invention is further facilitated by using radially compliant elements mechanically in series with the mechanical bearings. Providing for a lower radial stiffness allows the flywheel to traverse its rigid body resonance at a low speed. Above that speed, the flywheel spins about its mass center instead of the geometric center and radial loading on the bearing becomes much lower. The power loss from rotation can also be reduced. The flywheel can then smoothly and easily operate to higher speeds. Balance requirements for the flywheel can be significantly reduced, reducing costs and extending mechanical bearing life. In one embodiment, the radial support allows the flywheel to traverse its cylindrical rigid body critical resonance at a speed that is less than 25% of the normal fully charged operation speed.

The use of the radially compliant elements or springs with the mechanical bearings also has the effect of helping the flywheel to rotate stably while having axially free sliding connections to the bearings. Although not completely free, due to friction, the flywheel is essentially mechanically unrestrained by the mechanical bearings, so that it can move axially. Use of sliding joints where energy can be lost from frictional damping in the rotating object is well known in the field of high speed machinery to potentially cause problems with nonsynchronous rotordynamic whirl and is usually avoided. However, rotor whirl can be avoided if the foundation stiffness is made sufficiently low for the mass of the rotating object. In this case, the radially compliant elements or springs that allow the flywheel to spin above the rigid body resonance also help keep the system stable with the reduced stiffness.

In one aspect of the invention, the radially compliant elements are placed between the mechanical bearings and the flywheel such that they rotate with the flywheel. The result is that above the rigid body resonance, the radial springs simply deflect and the flywheel rotates about its mass center Because the springs rotate with the flywheel, the springs do not cycle with each revolution. The life of the springs in the flywheel systems are thus increased for longer-term reliable operation. The radially compliant element can be a radial spring such as a tolerance ring or alternatively a quill shaft.

In another embodiment, the radial springs do not rotate with the flywheel but have a fatigue life of greater than 5 billion cycles of radial deflection equal to the radial distance between the mass center and the geometric center of said flywheel. This provides for at least 1 year of continual rotation at 10,000 rpm. An even higher cycle life such as ten to twenty times higher is even more preferable to preferably last the life of the system. Besides reducing the rigid body resonances, the low radial stiffness can potentially allow the flywheel to spin smoothly through other vibration modes that may exist depending on the system construction.

The invention also makes the flywheel system significantly less prone to damage during shipping, handling and installation. The axially unrestrained condition of the flywheel in the mechanical bearings prevents the flywheel from axially impact loading the bearings with the weight of the flywheel when the system is set down. The radial compliant elements in series with the mechanical bearings prevent damage from radial impact loading. The result of the invention is a much more robust flywheel system employing mechanical bearings, a system that accounts for the axial flywheel dimension changes, a system that can rotate to higher speeds for storing more energy and a system that maximizes the life of the mechanical bearings by elimination of axial loading from the flywheel simultaneously with greatly reduced radial loading.

The invention provides for greatly increased mechanical bearing life of the flywheel system. To extend the bearing life even further, the flywheel can be designed to operate with a slower rotational speed, reducing the bearing fatigue cycles incurred. In one aspect of the invention, the flywheel is constructed primarily from steel instead of composite materials to provide a lower operating speed. The flywheel can also preferably be constructed with an increased diameter so its normal fill speed operation is at less than 25 krpm. Implementing a motor/generator that has an air core armature can also further reduce bearing loads. The air core armature provides high efficiency while reducing or eliminating non-circumferential force generation during operation. dr

DESCRIPTION OF THE DRAWINGS

The invention and its many attendant advantages will become more clear upon reading the following description of the preferred embodiments in conjunction with the following drawings, wherein.

DESCRIPTION OF THE PREFERRED EMBODIMENT

Figure 1:
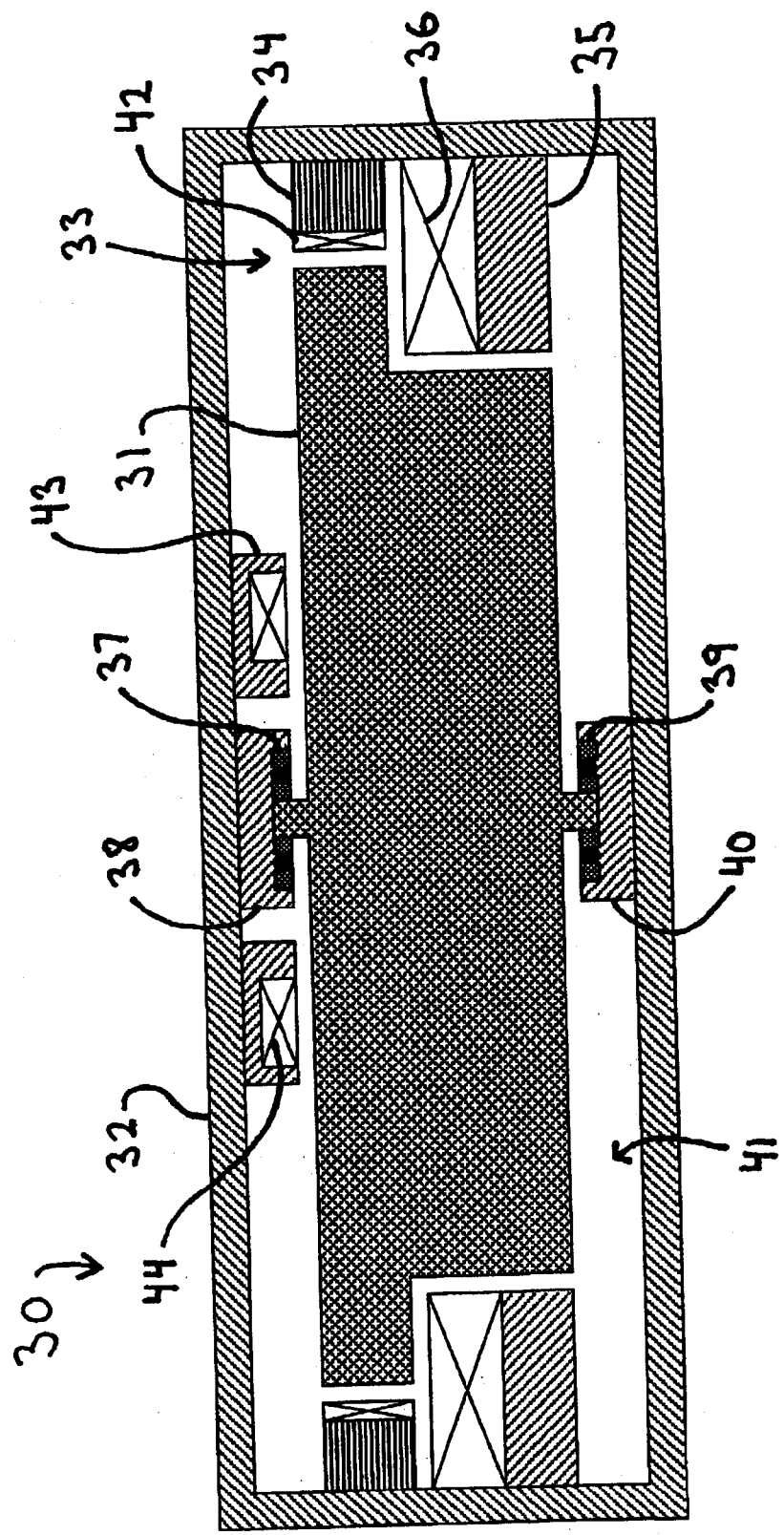
FIG. 1 is a schematic elevation of a prior art flywheel energy storage system with a mechanical and magnetic bearing system.
Figure 2:
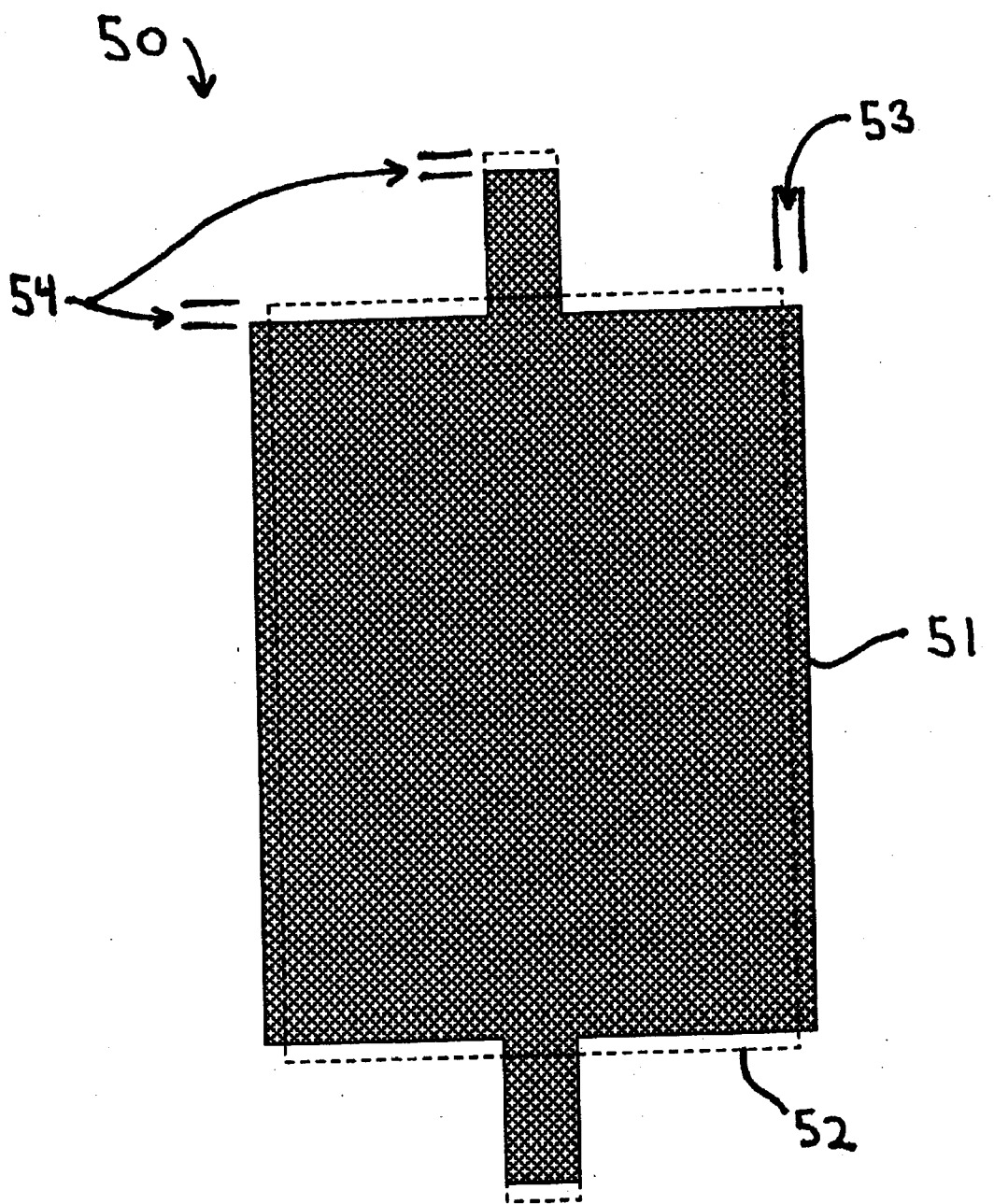
FIG. 2 is a sectional elevation of a solid cylindrical flywheel illustrating the dimensional effects on the flywheel when rotated to high speed.
Figure 3:
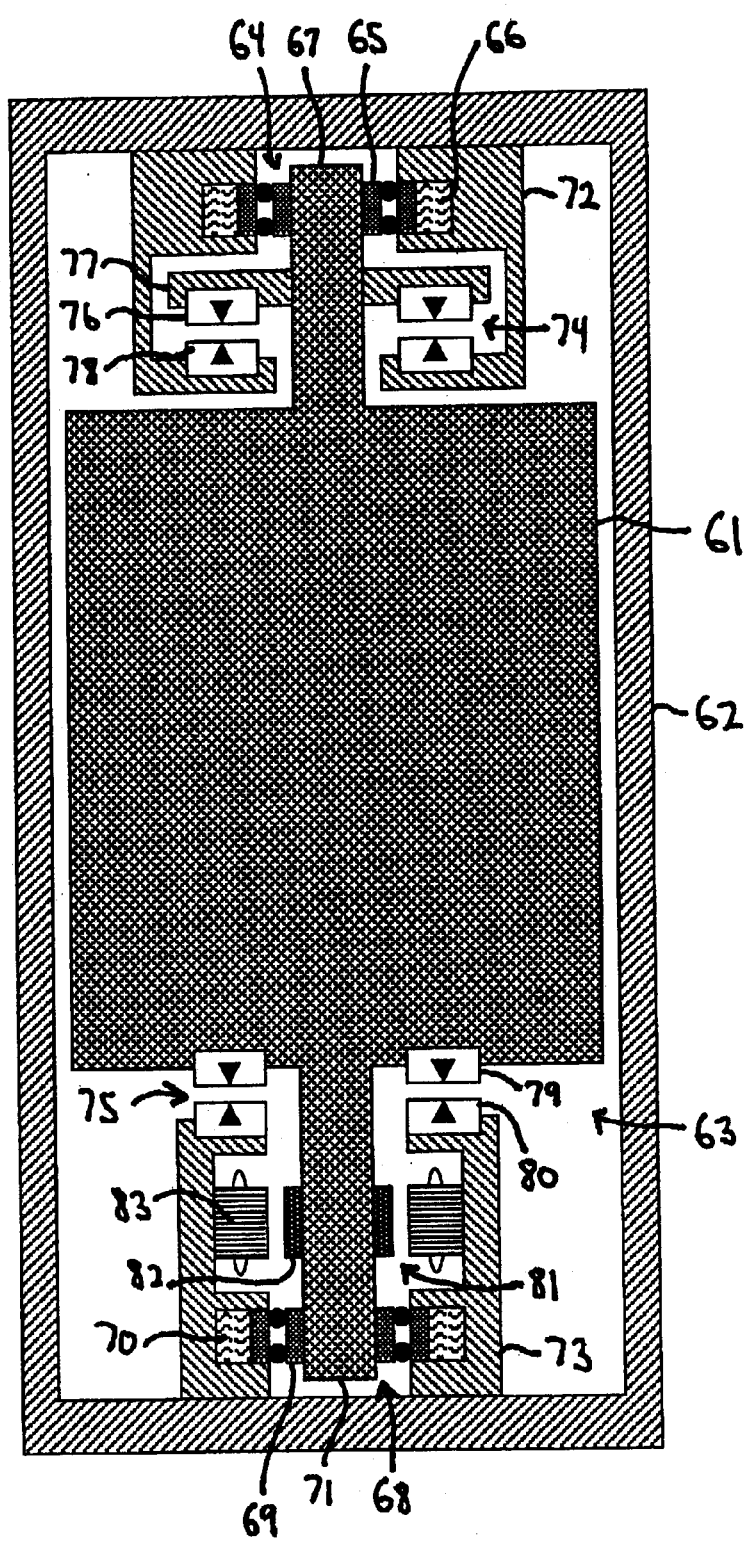
FIG. 3 is a schematic elevation of a flywheel energy storage system in accordance with the invention.

Turning to the drawings, wherein like reference characters designate identical or corresponding parts,: and more particularly to FIG. 3 thereof, a flywheel energy storage system 60 in accordance with the invention is shown having a flywheel 61 supported for rotation about a substantially vertical axis of rotation inside a sealed container 62. The inside of the container 62 is a chamber 63 preferably maintained at a vacuum or other low-drag atmosphere for reduction of aerodynamic drag. In systems where drag is less of a concern, the low drag atmosphere can be a small molecule gas such as helium instead of a vacuum, with the result of potentially lower costs but higher drag loss.

The flywheel 61 is radially supported with upper and lower mechanical bearing supports 64 and 68 engaging upper and lower flywheel shafts 67 and 71. The bearing supports 64, 68 use rolling element bearings 65 and 69 to allow low loss rotation. The bearings can be individual ball bearing sets or tandem multiple preloaded angular contact bearing sets to share the radial loading and insure adequate and accurate preload for long term operation, as shown. The bearings preferably use the minimum preloading amount, which is a function of the bearing size. Ceramic hybrid bearing sets, ceramic balls in metal or steel races, are preferred for highest speed and longest life operation. They can be lubricated with grease, oil or more preferably a dry lubricant such as molybdenum disulfide to prevent contamination of the vacuum in the chamber 63. The rolling element bearings 65, 69 are mechanically in series with radial compliant elements 66, 70 for reducing the radial stiffness of the bearing supports 64, 68. In this configuration, the compliant elements, which can be radial springs, are located between the mechanical bearing sets 65, 69 and the support housings 72, 73 and thus are stationary. The radial compliant elements are preferably constructed from metal for long life in vacuum, and for high thermal conductivity. They can be made from numerous constructions including metal mesh, or tolerance rings such as those sold by USA Tolerance Rings Inc.

The weight of the flywheel is borne axially by upper and lower magnetic bearings 74 and 75. The upper and lower flywheel shafts 67 and 71 slide axially freely (with some friction) inside the rolling element bearings 65, 69 such that the mechanical bearings do not carry appreciable axial loading from the flywheel. Some very small loading is transferred to the bearings from axial friction with the flywheel shafts 67, 71, however this amount would be negligible compared to the weight due to the sliding interface. Because the axial loading is removed from the mechanical bearings, their lives can be greatly extended. The life of rolling element bearings is generally a cubic function of the applied loading such that a reduction of the bearing loads by half results in an increase in life by a factor of eight. Further adding to the benefits of axial load elimination of the invention is that axial loads are typically many times more fatiguing to common angular contact bearings than radial loads. In some cases, depending on the bearing size and configuration, axial loads can be as much as 35 times more fatiguing to the bearing than an equivalent value radial load.

In the flywheel system shown in FIG. 3, the magnetic bearings 74, 75 are passive. They have permanent ring magnets 76 and 79, or an annular array of magnets, attached to or rotating with the flywheel 61, arranged in axial repulsion with stationary ring magnets 78 and 80 in close axial proximity. The magnetic bearings can be employed at either the top or bottom of the flywheel, or at both ends. As shown, the top magnetic bearing 74 includes a thrust disk 77 attached to and rotating with the top flywheel shaft 67 for attachment of the rotating ring magnet 76. Because high power magnets such as NdFeB are mechanically weak in tensile strength, difficulty may be encountered in reinforcing the magnets for rotation to high speed, especially if the flywheel is very heavy and requires ring magnets of very large diameter and surface area to generate sufficient axial force. The magnet ring attached to the flywheel may be an annular array made from an assembly of individual magnet pieces around the circumference. The use of pieces prevents development of excessive hoop stresses that could otherwise cause the magnet to fail mechanically. Gaps between magnet pieces that develop when rotated to high speed are very small and thus are not magnetically problematic.

Magnets with axial magnetization are generally easier to manufacture and are lower in cost than radially magnetized magnets. Several designs of axial repulsion magnetic bearings can be constructed and used with the invention The magnetic bearings generate axial repulsive forces between the flywheel and the rest of the system. They can also generate some radial destabilizing forces that tend to push the flywheel radially off center and radially load the bearings. Care should be taken in the exact system design (magnet dimensions) to insure that these forces remain small for the entire allowable radial deflection of the upper and lower bearing supports 64, 68.

The mechanical rolling element bearings 65 and 69 provide radial support for the flywheel while the magnetic bearings carry the axial weight of the flywheel. The connection between the flywheel shafts and the mechanical bearings is unconstrained axially such that themagnetic bearings essentially carry all of the flywheel weight. This greatly extends the lives of the mechanical bearings by eliminating detrimental axial loading. The sliding connection also serves a second significant purpose by preventing dimensional changes in the flywheel from adding loading to the mechanical bearings. As a flywheel is rotated to very high speeds and stress levels, the outer diameter grows radailly. However, the large radial and hoop direction stresses cause the flywheel to shrink axially due to Poission Ratio contradiction of the flywheel material. If the bearings were rigidly connected to the flywheel, excessive bearing loading and possible bearing failure could result. The amount of contraction depends on the axial thickness of the flywheel and the operating stress levels, however contractions on the order of 0.050 inches are possible. The axial loading from dimensional changes can also result from temperature changes in the flywheel from motor/generator heating and or from temperature changes to the surrounding flywheel container.

The radial bearings are in series with compliant elements 66 and 70 such that the upper and lower radial support each have a low stiffness. The low radial stifffness allows the flywheel to operate above the rigid body resonance at a relatively low speed. Above the resonance, the flywheel spins about its mass center instead of geometric center and thus radial loads are significantly reduced, extending the bearing life. Having the transition through the resonance at low speed, such as less than 1000 rpm for some high speed systems, prevents encountering the resonance at a high speed which would cause extreme bearing loading and can possibly fail the bearings. Operating supercritically can also lower the bearing drag. In one embodiment, the radial support preferably allows the flywheel to traverse its cylindrical rigid body critical resonance at a speed that is less than 25% of the normal fully charged operation speed. Because the radial compliant elements are stationery, they are cycled as the flywheel rotates due to the offset between the mass center and geometric center of the flywheel. This distance is typically small at less than a few thousandths of an inch, especially for a balanced flywheel. In one embodiment of the invention, radial springs have a fatigue life of greater than 5–75 billion cycles of radial deflection equal to the radial distance between the mass center and the geometric center of said flywheel. This allows the flywheel system to last 1–15 years while rotating at 10 krpm. A longer fatigue life is preferable and can be attained by careful design and manufacturing. Small radial spring deflections resulting from a smaller offset between the mass center and geometric center of the flywheel, and from radial spring design improvements, can result in significantly longer fatigue lives. A thin metal spring or metal mesh that does not undergo significant bending stress can accomplish this.

The lower radial stiffness from the compliant elements also facilitates stable rotation to high speed. Sliding joints on rotating objects, which can dissipate energy through friction, are thought to be best avoided in rotating machinery design as they can lead to nonsynchronous rotordynamic whirl problems. However, rotor whirl is a function of the foundation flexibility. The lower radial stiffness imparted from having radial compliant elements in series with the bearings also helps the stability of the flywheel system despite having sliding connections.

During shipping, handling and installation of the flywheel system, the invention is much more robust and resistant to damage than prior art flywheel systems that use mechanical bearings. The axial unrestrained connection between the flywheel and mechanical bearings prevents impact damage to the bearings from the weight of the flywheel, especially when the system is set down hard. The radial compliant elements in series with the mechanical bearings also prevent damage from radial impact loading. The passive axial magnetic thrust bearings increase in repulsive force as the axial gap between ring magnets decreases, and will prevent contact in most shipping situations. In the event that the unit is dropped during shipment, the end of the shaft can be designed to contact the bottom of the housing or an impact absorbing bumper before the magnets make contact, to prevent damage to the magnets.

In operation, the flywheel 61 is accelerated and decelerated for storing and retrieving energy through an attached motor/generator 81. Many designs of motors and generators exist and could be used with the invention. The motor/generator is preferably a brushless design for long life. The motor/generator 81 shown is a brushless permanent magnet synchronous motor/generator type. The motor/generator 81 uses magnets 82 attached to the lower flywheel shaft 71. The magnets 82 cooperate with a surrounding laminated stator 83 for electrical/mechanical energy conversion.

Figure 4:
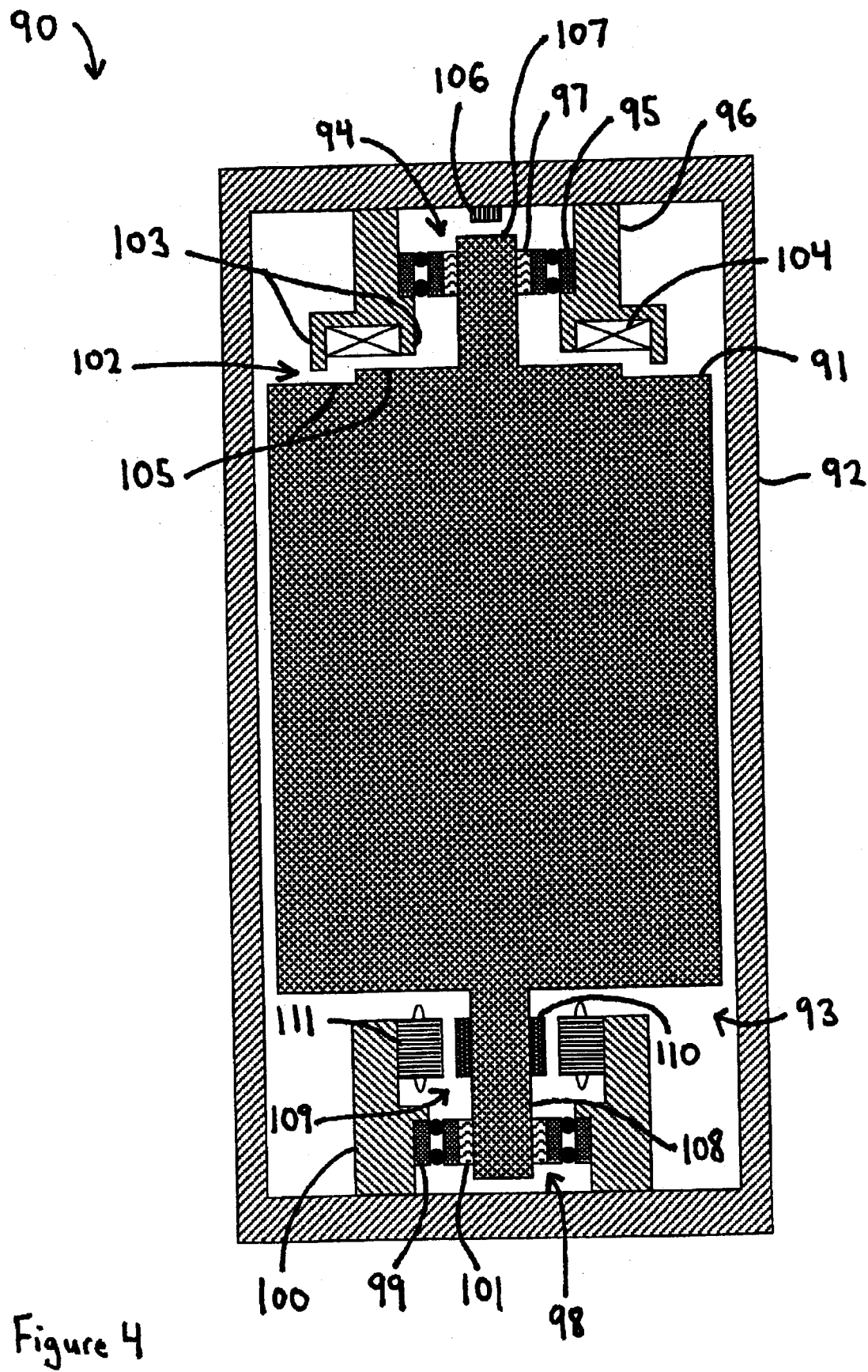
FIG. 4 is a schematic elevation of another configuration of flywheel energy storage system in accordance with the invention.

Another flywheel system 90, shown in FIG. 4, includes a flywheel 91 mounted on radial bearings 94 and 98, and an axial magnetic bearing 102 for rotation about a vertical axis inside a container 92 having an evacuated internal chamber 93. The flywheel is accelerated using a motor/generator 109 using magnets 110 attached to the flywheel shaft 108 that magnetically interact with a surrounding stator 111 to accelerate the flywheel 91 to store energy, and decelerate the flywheel to recover energy. The flywheel 91 is radially supported by the upper and lower mechanical bearing supports 94 and 98. The bearing supports 94, 98 use preloaded tandem pair angular contact bearings 95, 99. Radial compliant elements 97 and 101 may be used in tandem with the bearings 95 and 99 such that the compliant elements rotate with the flywheel 91. The result of having the compliant elements rotate with the bearings is that, above the rigid body resonance speed, they do not continue to be cycled and just simply deflect to a stable deflected position to allow rotation about the mass center. This provides a much longer life for the compliant elements. If the compliant elements 97, 101 are low cost tolerance rings, the rings may be selected to minimize the axial friction between the flywheel shafts 107, 108 and the tolerance rings to reduce the potential for any axial loading from the flywheel 91 being transferred to the bearings 95, 99. However, some friction is required to overcome the drag torque in rotating the mechanical rolling element bearings. Placing the radial compliant elements such that they make up the sliding connection provides the benefit of rotational friction in the axial unrestraint.

The magnetic bearing 102 for axial levitation of the flywheel 91 uses an electromagnetic coil 104 to provide stable axial levitation. The coil in this case is part of a simple stationary electromagnet 103 located at the top of the flywheel 91. The flywheel 91 is constructed of steel and thus the electromagnet 103 exerts an upward force on the flywheel 91. Control for the coil power is provided by an controller (not shown) using feedback from an axial sensor 106 that senses the flywheel axial acceleration or more preferably simply the flywheel axial position. Other magnetic bearing control schemes using the electromagnetic coil 104 for also sensing the flywheel position are known and could alternatively be employed.

Figure 5:
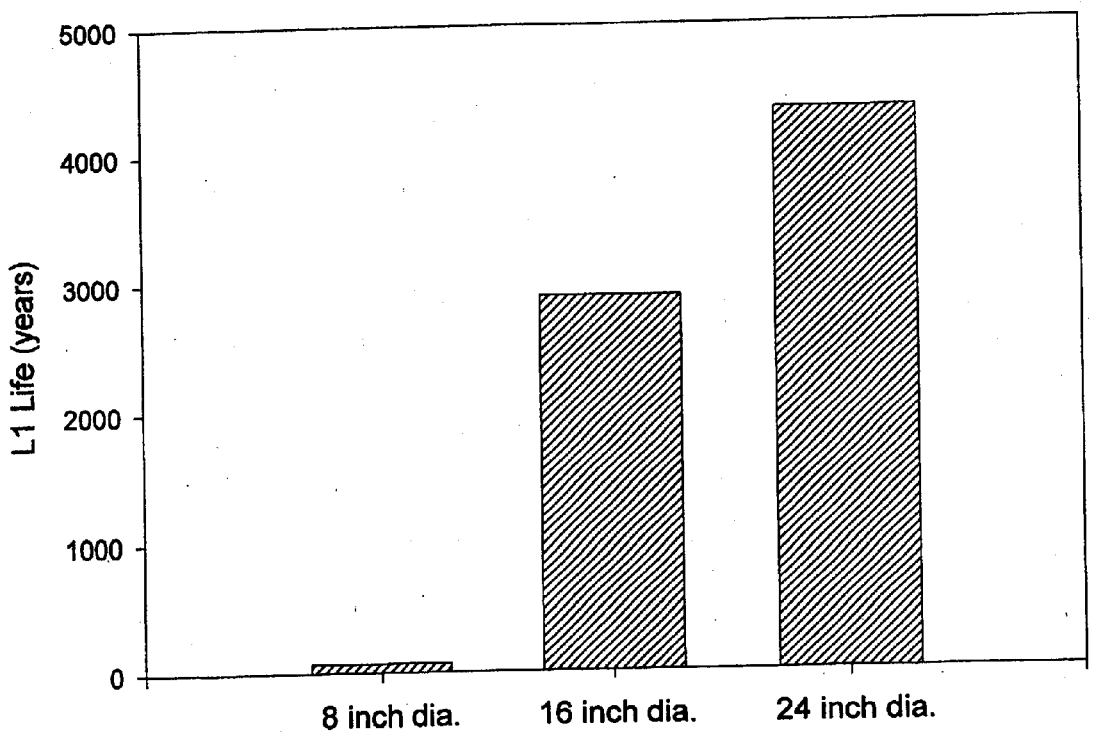
FIG. 5 is a bar chart comparing the mechanical bearing life versus flywheel diameter for use with the invention.

Because attractive magnetic bearings inherently generate unstable tilting moments that would tend to tilt the flywheel, the electromagnet 103 and the axial end of the flywheel 105 can be curved step-wise to reduced generation of such moments. A tilting moment exerted on the flywheel 91 by the magnetic bearing would cause extra radial loading on the radial mechanical bearings 95, 99 and thus would be undesirable. The use of an active magnetic bearing as shown in this configuration can reduce costs by not requiring permanent magnets although the costs of a control system is required, and it can potentially allow higher rotational speeds by not having rotating magnet loading. The life of rolling element bearings, such as ball bearings, is greatly influenced by the loads that the bearings must carry. Larger bearings can carry larger loads, however they can be rotated only at lower speeds. They also have inherently higher losses, which may or may not be problematic depending on the application and system design. The stress and hence material utilization of the material in a flywheel is related to the square of the peripheral speed and not the rotational speed. Because it is desirable to most effectively utilize a flywheel and also to have the longest bearing life, it is preferable to have a high peripheral speed with a low rotational speed. This is made possible by using flywheels that have a large diameter. It is further facilitated by using metal or steel flywheels that have lower tip speed capabilities than composite material flywheels. A comparison of mechanical bearing life versus flywheel diameter for solid steel flywheels used with the invention is shown in FIG. 5. All of the flywheels are operating with the same stress level and tip speed, 500 m/sec. All bearings are subject to 40 lbs radial loading and zero added axial loading using tandem preloaded angular contact bearing pairs all preloaded with the minimum axial preloads. The bearings are ceramic hybrids using dry lubricant. As shown, an 8 inch diameter flywheel rotates at 47 krpm, a 16 inch diameter flywheel rotates at 23.5 krpm and a 24 inch diameter flywheel rotates at 15.7 krpm. The bearing life for a slower rotating flywheel is longer than for a faster rotating flywheel due to a lower number of cycles per interval of time as expected. This is a linear relationship. However, a secondary effect has also been found to take effect. The slower rotational speed of a larger flywheel also allows a larger bearing set to be used. The larger bearing for the same radial load dramatically increases the life of the mechanical bearing as shown. An L1 life corresponds to 99% survival rate of the bearings for that loading and life. The life of the 24 inch diameter bearing is shown to be a smaller increment higher than the 16 inch diameter flywheel as compared to the difference between the 16 inch and 8 inch flywheels. This is because the 16 inch and 24 inch flywheels are both shown using the same size bearings and the extended life is merely the result of the slower rotational speed. Other effects such as maintaining bearing lubrication must also be considered in the bearing life and other types of bearings and lubrication methods can be applied. However, larger diameter and steel flywheels can dramatically increase the mechanical bearing life with the invention. In another embodiment of the invention a flywheel constructed of steel is used with diameter greater than length for longer mechanical bearing life. Preferably, the flywheel rotates at 25 krpm or less in normal operation. Solid steel disks allow maximum energy storage by having equivalent radial and hoop stresses, however steel ring flywheels rotate with even lower tip speeds and could also be employed with the invention.

Figure 6:
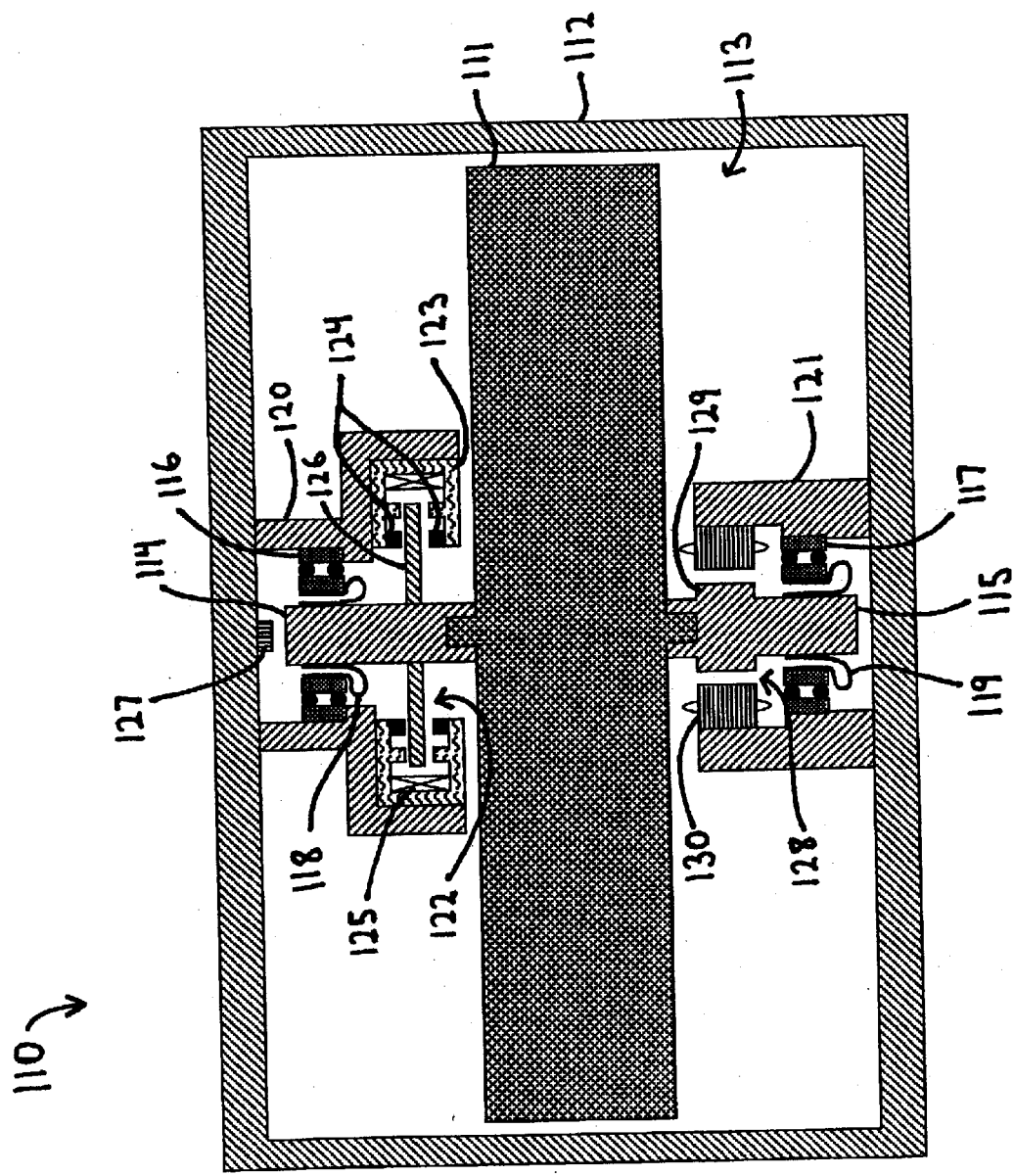
FIG. 6 is a schematic elevation of another flywheel energy storage system in accordance with the: invention.

Another flywheel system 110, shown in FIG. 6, has a steel flywheel 111 with diameter greater than length, used for storing energy. The flywheel 111 rotates about a substantially vertical axis inside a container 112 having an internal evacuated chamber 113. The flywheel is accelerated and decelerated using a brushless motor/generator 128, in this case, of the reluctance type. The flywheel shaft 115 contains a radial gear rotor 129 that cooperates with a surrounding stator 130 to form the motor/generator 128. A separate motor and generator could also be employed. The flywheel 111 is radially supported using upper and lower ball bearing sets 116 and 117. Series connected radially compliant elements 118 and 119 are attached between the inner race of the bearings 116, 117 and the flywheel shafts 114 and 115 such that they rotate with the flywheel 111. In this case, another aspect of the invention is also illustrated. The axial unrestrained connection between the flywheel 111 and mechanical bearings 116, 117 is provided not through sliding connections but through low axial stiffness springs which in this case are also the radial compliant elements 118 and 119. A magnetic bearing 122 carries the axial weight of the flywheel, and illustrates yet a further aspect of the invention. The magnetic bearing 122 is a permanent magnet biased thrust bearing having an electromagnetic coil 125 for axial force generation and is controlled using a position sensor 127. A thrust disk 126 attached to the upper flywheel shaft 114 provides a target for axial force generation. A steel yoke 123 provides a path for the flux from the electromagnetic coil 125, and permanent magnets 124 amplify the force. The benefits of using permanent magnet bias include higher lifting force capability and lower power consumption as well as more linearized response.

Figure 7:
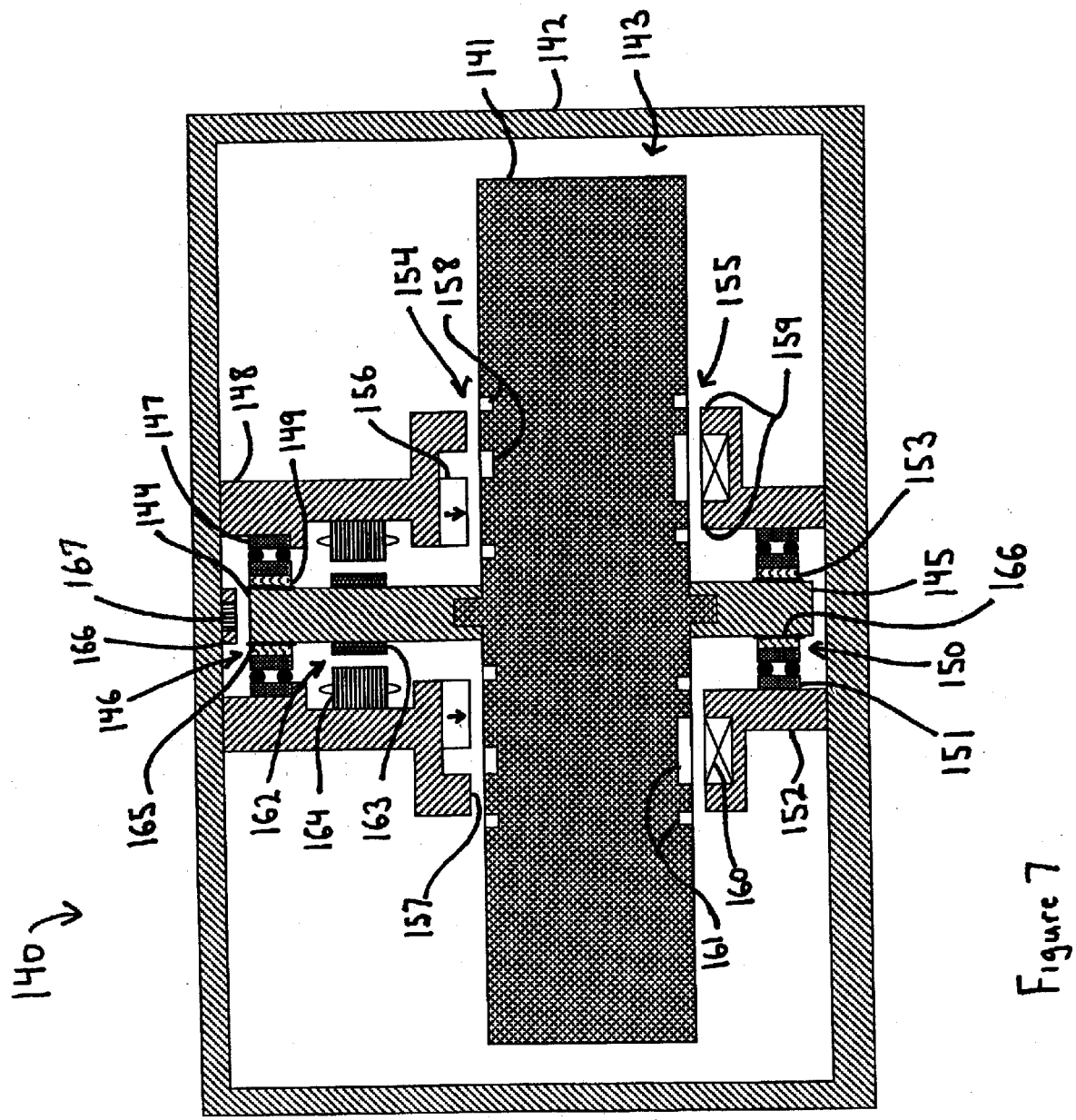
FIG. 7 is a schematic elevation of another flywheel energy storage system in accordance with the invention.

Another flywheel energy storage system 140, illustrated in FIG. 7, uses a steel disk flywheel 141 that rotates inside a container 142 having an internal chamber 143 maintained at a vacuum The flywheel is accelerated and decelerated using a brushless motor/generator 162 having permanent magnets 163 attached to an upper shaft 144 and cooperating with a surrounding fixed stator 164 for energy conversion. The flywheel 141 is radially supported using upper and lower bearing supports 146 and 150. The bearing supports use tandem preloaded angular contact bearing pair sets 147 and 151 for rotation. Radially compliant elements 149 and 153 reduce the radial stiffness. Liner tubes 165 and 166 can be used to allow free axial sliding between the flywheel shafts 144, 145 and the compliant elements 149, 153.

In this configuration, the magnetic bearing uses a permanent magnetic bearing 154 to carry the weight of the flywheel 141. The permanent magnetic bearing 154 drives flux through the flywheel 141 and returns through a yoke 157 to be magnetically efficient. A lower magnetic bearing 155, which is active, controls the flywheel axial position. The active magnetic bearing 155 uses an electromagnetic coil 160 and steel poles 159 to provide a downward force that balances the force from the upper magnetic bearing 154. A position sensor 167 provides feedback and an upper axial stop 166 prevents damage to the sensor when the system 140 is inoperative. The magnetic bearings in this configuration illustrate another aspect of the invention. The magnetic bearings 154, 155 provide radial centering stiffness or support as well as axial support. As explained previously, axial magnetic bearings tend to generate unstable tilting moments that try to tilt the flywheel. However in this case, the magnetic bearings 154, 155 generate some stable radial centering stiffness along with the axial force and unstable tilting moments. The radial centering stiffness of the upper magnetic bearing 154 works against the unstable tilt moment from the lower magnetic bearing and vice-versa. The passive radial centering stiffnesses are the result of putting annular grooves 158 and 161 in the faces of the flywheel 141. The annular poles 157, 159 and a ring magnet 156 tend to line up radially with the rotor poles created by the grooves 158, 161 and hence generate a positive radial stiffness. Other designs of passive radial magnetic bearings exist and could also be used. The passive radial stiffness reduces radial mechanical bearing loads that would otherwise result from the tilting moments of the upper and lower magnetic bearings 154, 155. They can also reduce loads imparted from external sources that would be carried by the mechanical bearings 154, 155. However, the mechanical rolling element bearings 146, 150 primarily carry the radial loading. Sources of radial loading include system tilt, earthquakes, unbalance, etc.

Figure 8:
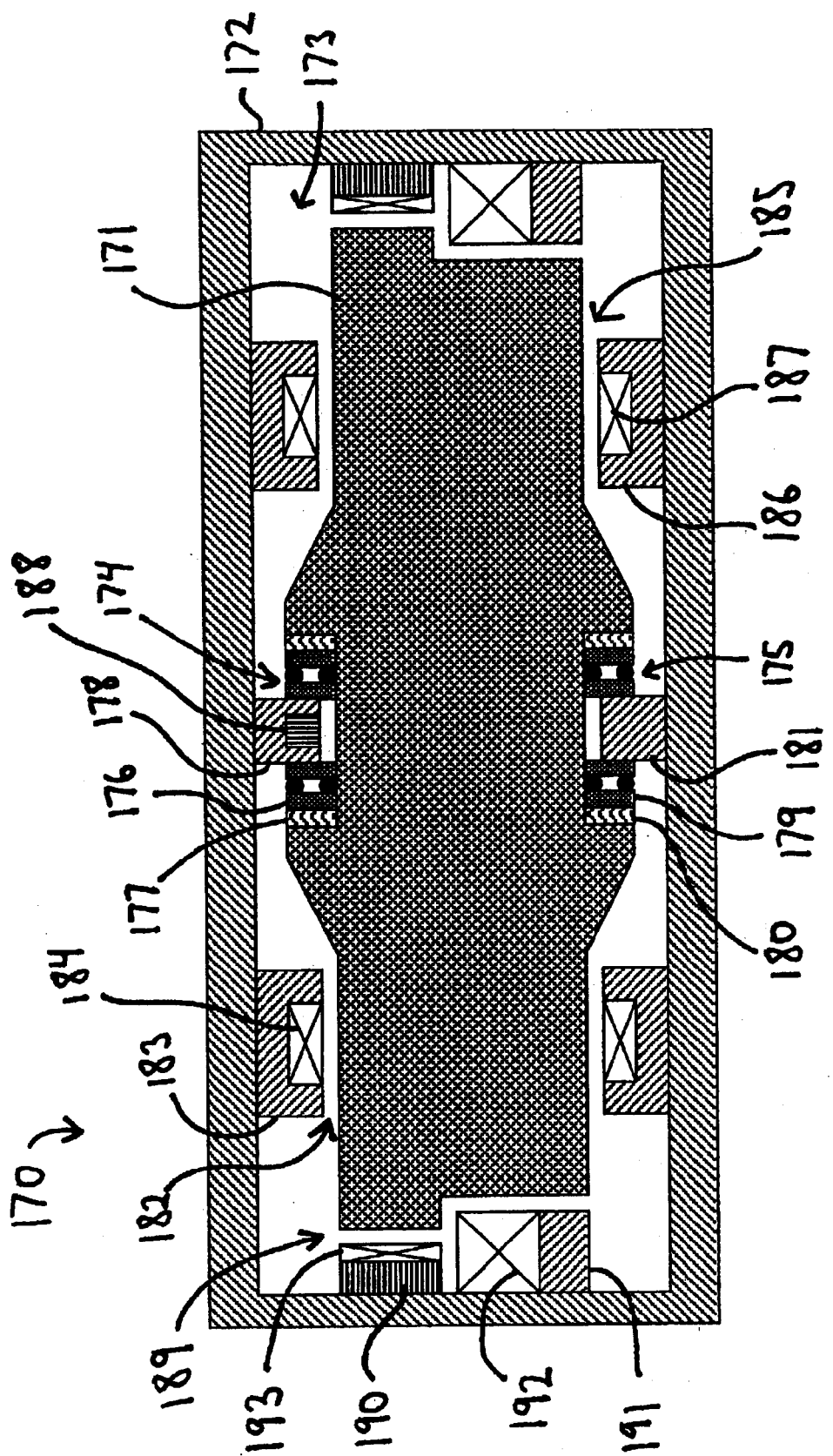
FIG. 8 is a schematic drawing of another flywheel energy storage system in accordance with the invention.

Another flywheel energy storage system 170, shown in FIG. 8, has a steel flywheel 171 with diameter greater than length. The flywheel 171 rotates inside an evacuated chamber 173 within a container 172. In this configuration, the flywheel is supported by upper and lower mechanical bearing supports 174 and 175 having mechanical bearing sets 176 and 179 with outer races that rotate with the flywheel 171. The mechanical bearings 176, 179 are attached to the flywheel 171 through the radial compliant elements 177 and 180 that also rotate with the flywheel. Upper and lower shafts 178 and 181 are stationary. The axial position of the flywheel 171 is maintained by upper and lower active magnetic bearings 182 and 185. The magnetic bearings use annular electromagnetic coils 184 and 187 along with yokes 183 and 186 to generate axial force, and an axial position sensor 188 provides feedback. During shipping and handling, the active electromagnetic bearings 182, 185 would not be operable. The flywheel bearing 179 could rest on a stop, not shown, on the shaft 181 or alternatively the flywheel could be mechanically axially supported, not through the lower bearing 179, to prevent damage. The flywheel 171 could be made to rest on the lower shaft 181 or yoke 186. Passive axial permanent magnet repulsion bearings on the other hand provide the benefit of axial support and free rotation without the use of power. A motor/generator 189 uses a laminated stator ring 190, motor/generator coils 193, a flux return ring 191 and an annular field coil 192 to provide energy conversion and voltage regulation.

Figure 9:
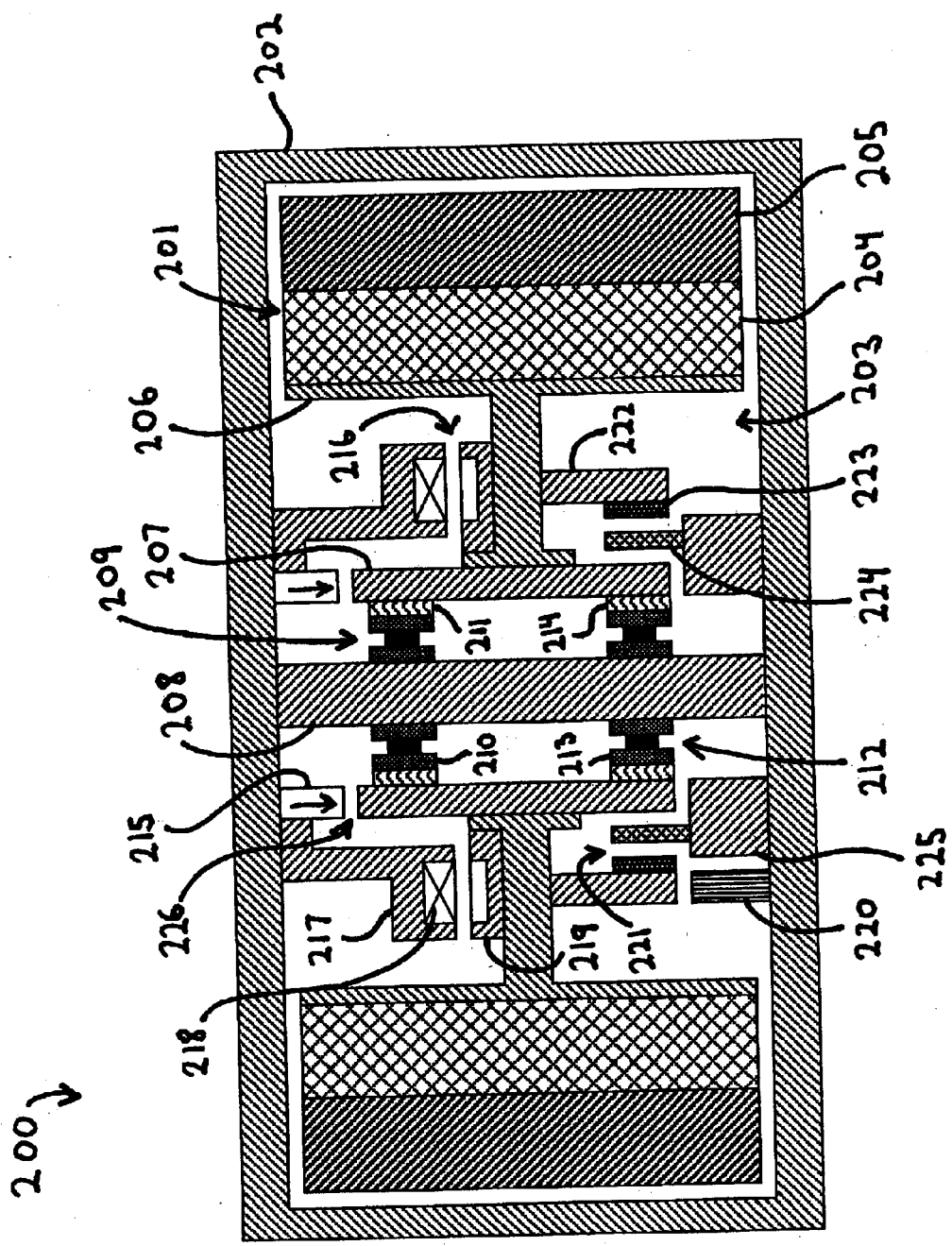
FIG. 9 is a schematic elevation of another flywheel energy storage system in accordance with the invention.

The invention is applicable not only for flywheel systems employing steel flywheels, but could also be used with higher speed composite flywheels, as shown in FIG. 9, wherein another flywheel energy storage system 200 is shown having a high speed composite flywheel 201 that rotates inside an evacuated chamber 203 within a container 202. The composite flywheel 201 is made of a hoop wound glass fiber/epoxy ring 204 inside a hoop wound carbon fiber/epoxy ring 205. Other configurations of composite flywheels could also be used with the invention. The flywheel is attached to a central tube 207 by a high elongation hub 206 that allows the flywheel 201 to grow radially with speed. Upper and lower mechanical bearing supports 209 and 212 support the flywheel radially. The supports include rolling element bearings 210 and 213 attached to radial compliant elements 211 and 214 for reduced radial stiffness. The mechanical bearings 210, 213 rotate about a stationary central shaft 208. The axial weight of the flywheel is supported by a combination of active and passive magnetic bearings 216 and 226. The active magnetic bearing 216 provides control through use of an electromagnetic coil 218 and yoke 217 that act upon a ferromagnetic target 219 attached to the hub 206. A position sensor 220 provides feedback. A passive magnetic bearing 226 using a permanent magnet ring 215 that acts on the central tube 207 reduces the force requirements of the active magnetic bearing 216 but cannot lift the entire weight of the flywheel 201.

The rolling element bearings in this configuration illustrate another aspect of the invention. Because the axial loading is essentially eliminated from the mechanical bearings, the mechanical bearings 210, 213 can be roller bearings. Roller bearings offer even higher radial load capability and life for a given radial load. They are also available in ceramic hybrid form for maximum speed capability.

The motor/generator 221 illustrates another aspect of the invention by using an air core design to reduce the radial destabilizing forces generated. The motor/generator 221 uses permanent magnets 223 on the bore of an outer tube 222 to create a radial magnetic field in cooperation with the central tube 207. Air core stator coils 224 attached to a support 225 provide for power conversion. Other designs or air core motor/generators could also be used. Likewise, an axial gap motor/generator could also be used to prevent generation of radial motor/generator destabilizing forces that would add to the radial loads carried by the mechanical bearings.

Figure 10:
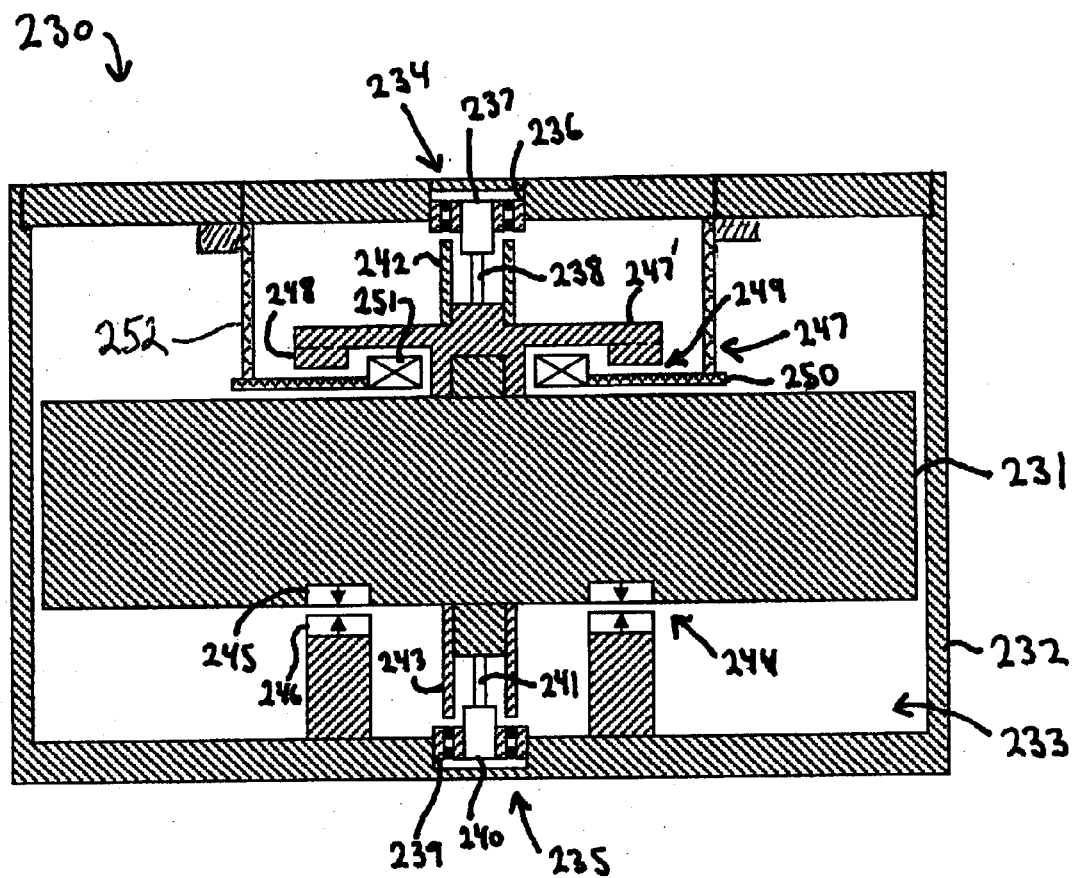
FIG. 10 is a schematic elevation of another flywheel energy storage system in accordance with the invention.

Another flywheel energy storage system 230 in accordance with the invention, shown in FIG. 10, has a steel disk flywheel 231 supported for rotation about a vertical axis in an evacuated chamber 233 inside a container 232 to reduce aerodynamic drag. The flywheel 23 1is supported radially by upper and lower rolling element bearings 234, 235. An axial magnetic bearing 244 supports the weight of the flywheel 231 by using a rotating permanent ring magnet 245 or annular array of magnets that axially repels a stationery permanent ring magnet 246. The radial support for the flywheel 231 uses tandem preloaded angular contact bearing pairs 236, 239 that are mounted to the container 232. The radial compliant elements or springs in this configuration comprise upper and lower quill shafts 238, 241. The quill shafts 238, 241 are connected to inner ends of shafts 237, 240 that are radially supported in the bearings 236, 239, but are axially unrestrained and can slide inside the bearings 236, 239. To prevent potentially excessive radial displacement, limit tubes 242, 243 are provided. The limit tubes 242, 243 limit displacement by contacting the bearings or the housing.

The axial unrestraint by the radial support 234, 235 along with the use of a permanent magnet repulsive bearing 244 is that the temperature effects do not effect the loads or life of the bearings 236, 239. Permanent magnets have a temperature coefficient whereby they tend to have reduced flux density with elevated temperature. The repulsive axial magnetic bearing 244 results in a levitation height that changes with temperature and the mechanical bearings are unaffected due to the unrestraint or free sliding connection.

The flywheel 231 is accelerated and decelerated using an attached motor/generator 247. The motor/generator 247 uses an air core armature 250, which reduces or eliminates generation of destabilizing forces that must be carried by bearings 234, 235, 244. The motor/generator 247 uses a steel disk 247' having an annular array of multiple circumferentially spaced protrusions 248 around the circumference that act as poles and form an air gap 249, in which the air core armature 250 is supported by a support tube 252. A concentric annular field coil 251, supported on in inner circumference of the air core armature 249, generates flux that travels in a flux path through the flywheel 231 and steel disc 247', is focused into axial rays by the protrusions 248, and jumps the air gap 249 through the air core armature 250, inducing an alternating current in the air core armature 250 as the flywheel 231 rotates. The field coil 251 provides a simple and effective method for power regulation. Raising or lowering the current to the field coil 251 for a given speed of the flywheel 231 can control the back emf of the motor/generator 247.

Figure 11:
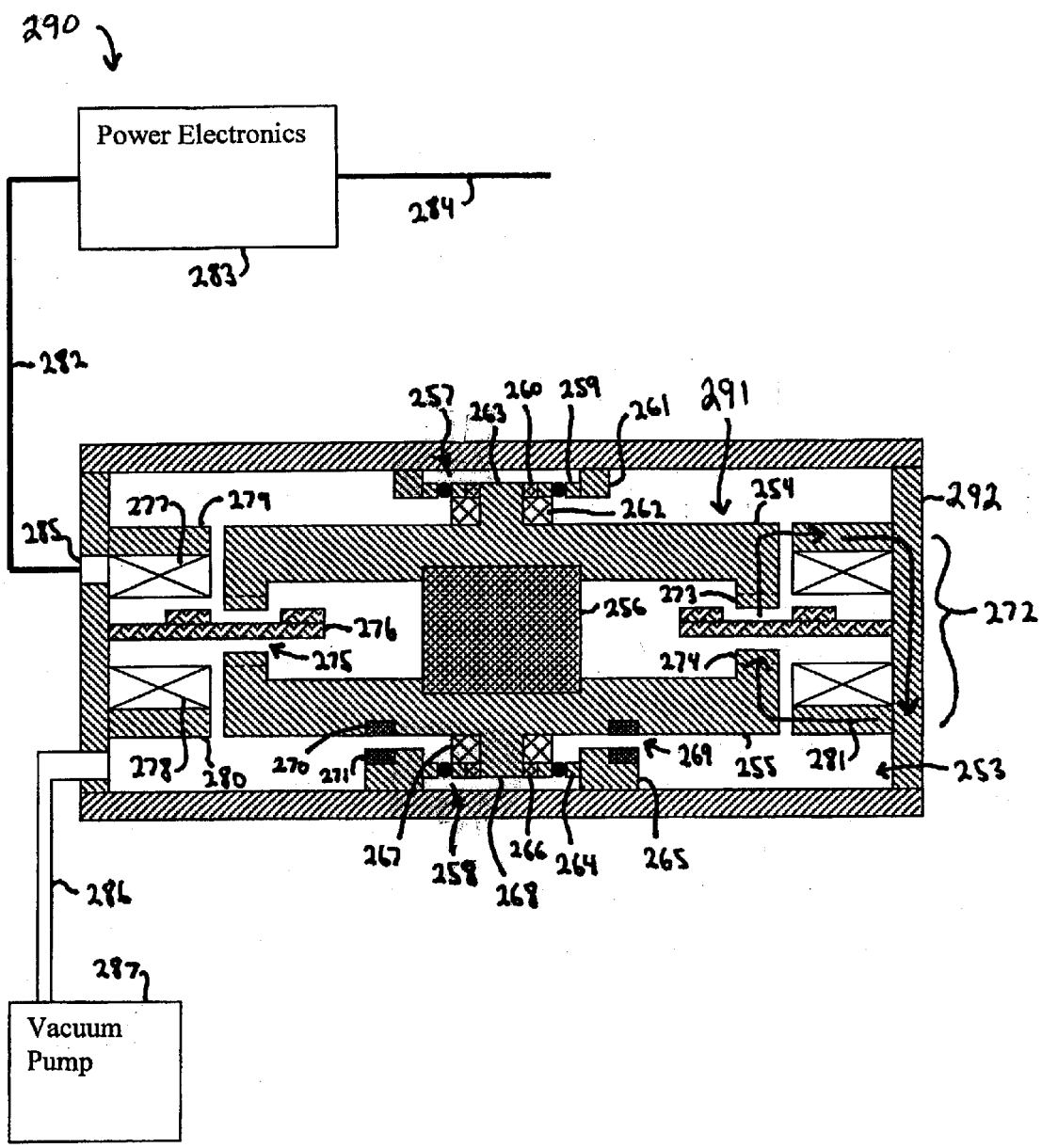
FIG. 11 is a schematic elevation of another flywheel energy storage system in accordance with the invention.

Another flywheel energy storage system 290, shown in FIG. 11, includes a flywheel 291 having multiple piece construction, and supported for rotation about a vertical axis in an evacuated chamber 253 inside a sealed container 292. The flywheel 291 is constructed from two steel rotor portions 254, 255 that are connected together by a stainless steel magnetic insulator 256. The rotor portions 254, 255 have multiple, circumferentially spaced protrusions 273, 274 around the outer circumference that face an armature airgap 275 that is created between the two rotor portions 254, 255. An annular air core armature 276 is located in the armature air gap 275. Field coils 277, 278 generate flux that travels in a flux path 281 to and from the flywheel 291 through steel poles 279, 280, across the air gap 275 and through the air core armature 276. The flux induces alternating current voltage in the armature 276 as the flywheel 251 rotates. Wires 282 for the armature 275 and the field coils 277, 278 exit the sealed container 292 through a vacuum tight feedthrough 285 and connect to power electronics 283 and a power buss 284. The vacuum in the chamber 253 is maintained by a vacuum connection 286 to an external vacuum pump 287.

The flywheel 291 is supported radially by upper and lower mechanical bearings 257, 258 and an axial magnetic bearing 269 supports the weight of the flywheel 291. The axial magnetic bearing 269 uses rotating permanent magnets 270 that axially repel stationery permanent magnets 271. The radial supports 257, 258 comprise single rolling element mechanical bearing sets 259, 264 that are attached to stationery mounts 261, 265. Radially compliant elements or tolerance rings 260, 266 connect the bearings 259, 264 to the flywheel shafts 263, 268 and allow for axial sliding. Because rolling element bearings typically require some small amount of preload to prevent ball skidding and bearing damage, axial springs 262, 267 provide axial preload against the flywheel 291 and essentially against each other. To maintain proper preload despite changes in the potential axial position of the flywheel, the preload springs 262, 267 preferably have a lower stiffness than the axial magnetic bearing 269. The stiffness is preferably much lower so that axial displacement of the flywheel 291 from temperature changes to the magnetic bearing 269 do not change the bearing preload by more than a pound or so. Typical required preloads can be as low as 5 pounds for bearings that radially support a flywheel weighing several hundred pounds, but they vary depending on the many factors of the system design. Other arrangements of preload springs and bearing locations could also be utilized in accordance with the invention. For instance, the preload springs could be mounted stationery and the mechanical bearings could be made to slide axially in the stationery mounts. The benefit of using single bearing pairs is reduced costs and lower drag losses, however they provide lower radial load capacity.

Figure 12:
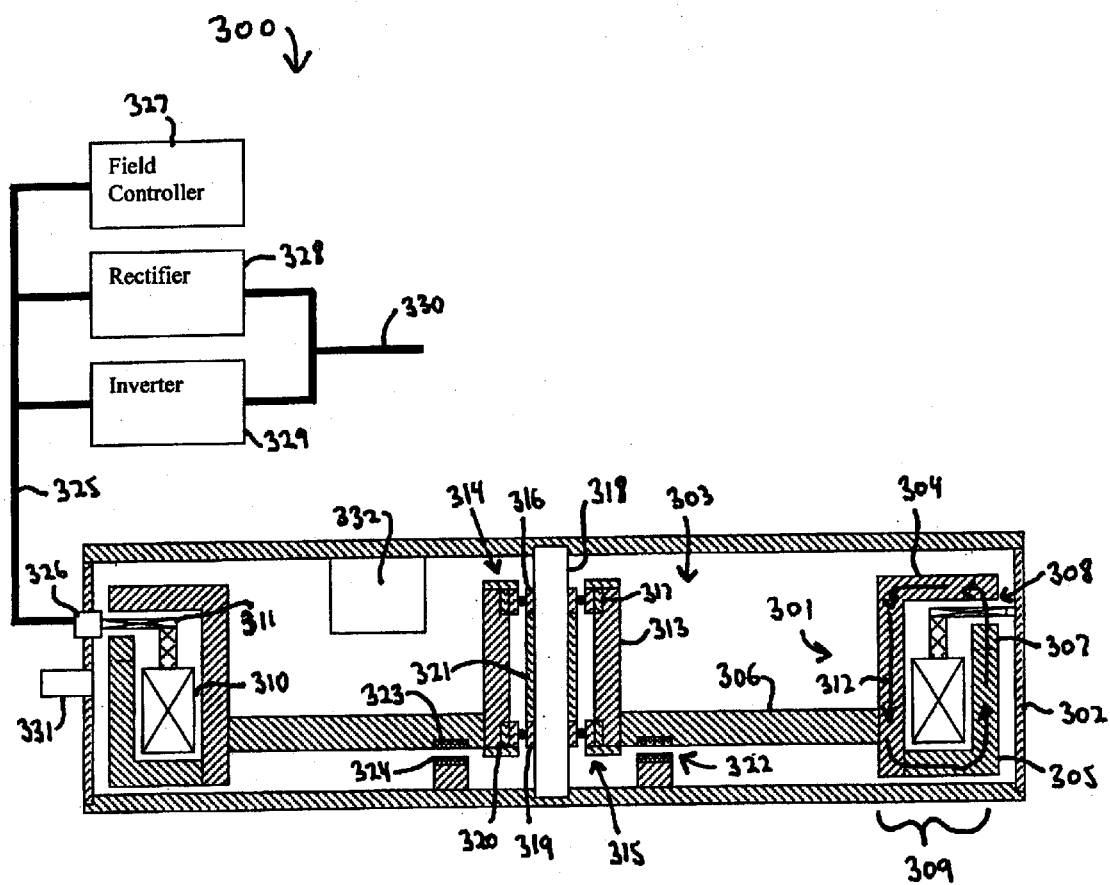
FIG. 12 is a schematic elevation of another flywheel energy storage system in accordance with the invention.

Another flywheel energy storage system 300, shown in FIG. 12, has a steel flywheel rim 301 that rotates in an evacuated chamber 303 inside a sealed container 302. The flywheel rim 301 is comprised of two rim pieces 304, 305 that are assembled to create an armature airgap 308. The rim 301 has an annular array of multiple circumferentially spaced protrusions 307 that face the armature air gap 308 and form poles of a motor/generator 309. A field coil 310 generates flux that travels in a flux path 312 through the rim pieces and across the air gap 308, inducing alternating current voltage in an air core armature 311 located in the armature air gap 308, as the flywheel 301 rotates. Wires 325 from the motor/generator 309 exit the container 302 through a sealed connection 326. A field controller 327 controls the current to the field coil 310 to control the induced voltage in the armature 311. A rectifier 328 rectifies power from the armature 311 to a DC buss 330 when generating power and an inverter 329 produces synchronous alternating current to drive the motor/generator 309 as a motor for storing energy.

The rim 301 is connected to a central tube 313 through the use of a hub 306. The flywheel 301 is supported radially by upper and lower mechanical bearings 314, 315, and the weight of the flywheel 301 is supported by an axial magnetic bearing 322. The flywheel 301 rotates about a stationery central shaft 318. Single ball bearing sets 316, 319 slide on the central shaft 318 and connect to the central tube 313 through radial springs 317, 320. The bearings 316, 319 are axially preloaded by a single central spring 321 on the center shaft 318.

A vacuum pumping port 311 allows for pulling of an initial vacuum 303 and for sealing the container 302. An internal getter pump 332 maintains the vacuum 303 for the life of the flywheel system 300.

Obviously, numerous modifications and variations of the preferred embodiment described above are possible and will become apparent to those skilled in the art in light of this specification. Different attributes of all of the different disclosed configurations can be interchanged and are not intended to be exclusive for use with the other elements and attributes of a particular system configuration. Many functions and advantages are described for the disclosed preferred embodiments, but in many uses of the invention, not all of these functions and advantages would be needed. Therefore, I contemplate the use of the invention using alternate or fewer than the complete set of noted components, features, benefits, functions and advantages. Moreover, several species and embodiments of the invention are disclosed herein, but not all are specifically claimed, although it is intended that all be covered by generic claims. Therefore, it is my intention that each and every one of these species and embodiments, and the equivalents thereof, be encompassed and protected within the scope of the following claims, and no dedication to the public is intended by virtue of the lack of claims specific to any individual species.

Accordingly, it is expressly intended that all these embodiments, species, modifications and variations, and the equivalents thereof, are to be considered within the spirit and scope of the invention as defined in the following claims, wherein I claim:

1. A flywheel energy storage system having a flywheel that is supported by a combination mechanical and magnetic bearing system for rotation about a substantially vertical axis inside a container with low drag atmosphere, and is accelerated with a motor and decelerated with a generator for storing and retrieving energy, comprising:

rolling element mechanical bearings for providing radial support for said flywheel while leaving said flywheel mechanically unrestrained in the direction of said vertical axis, said rolling element mechanical bearings being located at top and bottom ends of said flywheel;

radially compliant elements mechanically in series with said rolling element mechanical bearings for reducing radial stiffness of said radial support; and a magnetic thrust bearing system for providing axial support for said flywheel;

wherein said flywheel is magnetically supported axially and is mechanically unrestrained axially by said mechanical bearings.

2. A flywheel energy storage system as described in claim 1 wherein:

said magnetic thrust bearing system is comprised of one or more rotating permanent magnets attached to the rotating flywheel that are in close proximity to one or more stationary permanent magnets such that the rotating and stationary magnets are in axial repulsion.

3. A flywheel energy storage system as described in claim 2 wherein:

said rotating permanent magnets are in the form of a ring that is an assembly of multiple individual magnets around said ring circumference.

4. A flywheel energy storage system as described in claim 2 wherein:

said magnetic bearing system includes two bearings located at both a top and a bottom ends of said flywheel.

5. A flywheel energy storage system as described in claim 2 wherein:

said flywheel is constructed primarily of steel.

6. A flywheel as described in claim 5 wherein:

said flywheel rotates in normal fully-charged operation at less than 25 krpm.

7. A flywheel energy storage system as described in claim 2 wherein:

said motor and generator uses an air core armature.

8. A flywheel energy storage system as described in claim 7 wherein:

said flywheel is constructed primarily of steel, said motor and generator comprises a field coil that generates flux through protrusions in said flywheel and said flux induces alternating current in said air core armature as said flywheel rotates.

9. A flywheel energy storage system as described in claim 1 wherein:

said magnetic thrust bearing system is comprised of one or more active controlled electromagnetic coils that control the axial position of said flywheel.

10. A flywheel energy storage system as described in claim 9 wherein:

said actively controlled electromagnet coil functions as part of a permanent magnet biased active magnetic thrust bearing.

11. A flywheel energy storage system as described in claim 9 wherein:

said flywheel is constructed primarily of steel.

12. A flywheel energy storage system as described in claim 1 wherein:

said radially compliant elements comprise one or more radial springs.

13. A flywheel energy storage system as described in claim 12 wherein:

said radial springs rotate with said flywheel.

14. A flywheel energy storage system as described in claim 12 wherein:

said radial springs do not rotate with said flywheel but have a fatigue life of greater than 5 billion cycles of radial deflection equal to the radial distance between the mass center and the geometric center of said flywheel.

15. A flywheel energy storage system as described in claim 12 wherein:

said radial springs comprise one or more quill shafts.

16. A flywheel energy storage system as described in claim 1 wherein:

said rolling element mechanical bearings comprise tandem preloaded bearing pairs.

17. A flywheel energy storage system as described in claim 1 wherein: said rolling element mechanical bearings on the top and bottom of said flywheel are each single bearings, and at least one resilient element engaged with said rolling element mechanical bearings for preloading said rolling element mechanical bearings, said resilient element having a axial stiffness lower than the stiffness of said magnetic thrust bearings for providing axial support for said flywheel.

18. A flywheel energy storage system as described in claim 1 wherein:

said motor and generator uses an air core armature.

19. A flywheel energy storage system as described in claim 1 wherein:

said flywheel is mechanically unrestrained for axial movement by an axial sliding connection between two surfaces between said flywheel and said container.

20. A flywheel energy storage system as described in claim 1 wherein:

said flywheel is mechanically unrestrained for axial movement by a low axial stiffness spring between said flywheel and said container.

21. A flywheel energy storage system as described in claim 1 wherein:

said radial support allows said flywheel to traverse its cylindrical rigid body critical resonance at a speed that is less than 25% of the normal fully charged operation speed.

22. A method for storing and retrieving energy in a flywheel energy storage system comprising:

supporting a flywheel about a substantially vertical axis by a combination mechanical and magnetic bearing system and accelerating and decelerating said flywheel with an attached motor and generator;

providing radial support for said flywheel with mechanical rolling element bearings located at the top and bottom ends of said flywheel wherein radially compliant elements are coupled mechanically in series with said rolling element mechanical bearings for reducing radial stiffness of said radial support; and providing axial support for said flywheel with one or more magnetic thrust bearings, wherein said flywheel is mechanically unrestrained to move axially by said mechanical bearings.

23. A flywheel energy storage system comprised of a flywheel that is supported by a combination mechanical and magnetic bearing system for rotation about a substantially vertical axis inside a container with low drag atmosphere and is accelerated and decelerated for storing and retrieving energy through use of a motor/generator, comprising:

rolling element mechanical bearings for providing radial support for said flywheel, said rolling element mechanical bearings being located at the top and bottom ends of said flywheel;

radially compliant elements mechanically in series with said rolling element mechanical bearings for reducing radial stiffness of said radial support; and one or more magnetic thrust bearings for providing axial support for said flywheel;

whereby said flywheel has an axial position that is controlled by said one or more magnetic thrust bearings.

* * * * *